Sept. 25, 1923.
O K SNYDER
1,469,194
WOODEN STEERING WHEEL WITH LAMINATED HUB.
Filed Jan. 19, 1923
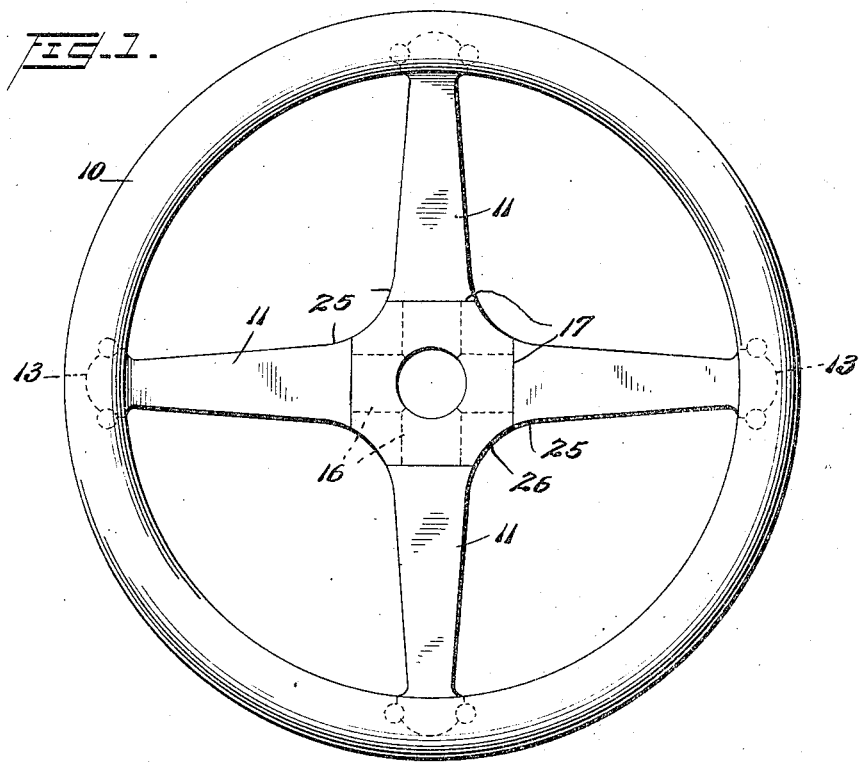
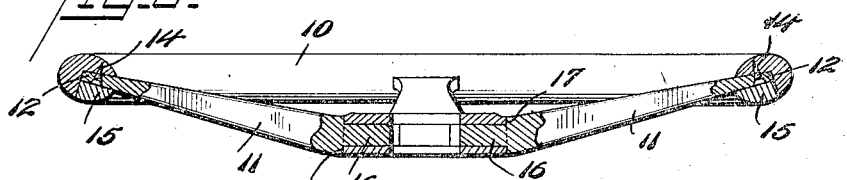
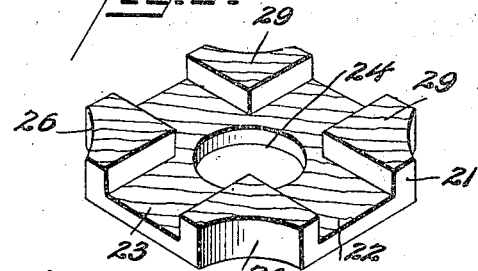
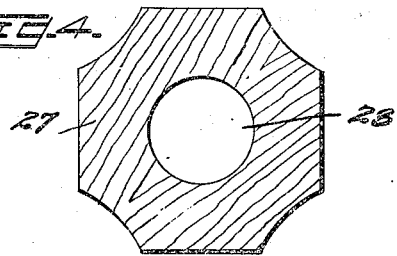
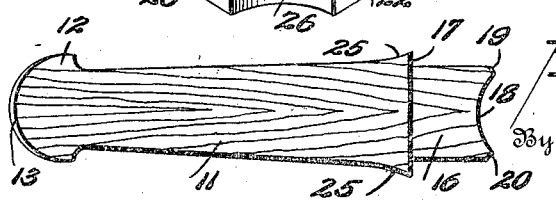
Inventor
O K Snyder,
By Watson, Coit, Morse & Grindle
Attorney Patented Sept. 25, 1923.

1,469,194

UNITED STATES PATENT OFFICE.

O K SNYDER, OF ONAWAY, MICHIGAN, ASSIGNOR TO AMERICAN WOOD RIM COMPANY OF ONAWAY, MICHIGAN, A CORPORATION OF MICHIGAN.

WOODEN STEERING WHEEL WITH LAMINATED HUB.

Application filed January 19, 1923. Serial No. 613,742.

*To all whom it may concern:*

Be it known that I, O K SNYDER, a citizen of the United States, and residing at Onaway, county of Presque Isle, State of Michigan, have invented certain new and useful Improvements in Wooden Steering Wheels with Laminated Hubs, of which the following is a specification.

This invention relates to steering wheels of the type which are used on motor vehicles such as automobiles, trucks, motor boats and airplanes. It relates particularly to steering wheels of the type stated in which the rim, spokes and hub portion are all composed of wood and are so formed as to be readily clamped and rigidly secured to the steering post by suitable well known metal clamping means, as set forth in the patent to Charles H. Kenrick, No. 1,434,616 granted Nov. 7, 1922, and constitutes an improvement on what is covered by that patent particularly as to the hub construction. In the patented construction the hub is formed largely of integral symmetrical lateral extensions or enlargements of the inner ends of the spokes and although that makes a very useful steering wheel having many advantages over those including metal spokes and hub, it is desirable for a number of reasons to dispense with the necessity for making the spokes with segmental enlargements. The present invention resides in a structural arrangement which does not include such extensions and which can be manufactured more easily and at less expense and which will have all of the strength and lasting qualities desirable in use. It embodies a hub including upper and lower disks each composed of a single piece of wood extending across the inner end portions of the spokes and to the margin of the hub, the grain of the wood of one disk being at right angles to that of the other disk and the grain of both disks being at an angle to the grain of each spoke. This crossing of the grain of the layers of wood in the hub portion tends to prevent splitting and to produce a very strong and lasting steering wheel. The novel features of the invention will be more fully understood from the following description and claims taken with the accompanying drawing.

In the drawings:

Fig. 1 is a plan view looking down on a steering wheel embodying the present invention;

Fig. 2 is a section on the line 2—2 of Figure 1, part of the spokes being shown in full line;

Fig. 3 is a perspective view of one of the wooden disks used to form the hub;

Fig. 4 is a plan view looking down on the other wooden disk used in forming the hub; and Fig. 5 is a plan view of a spoke detached from the hub and rim.

In the embodiment of the invention shown for purposes of illustration, the rim 10 is of the usual form rounded in section made of laminated wood and the spokes 11 are also made of wood and are preferably at a slight angle to the plane of the rim and enter it at their outer ends, as shown in Figure 2. The outer end portion 12 which enters the rim is slightly enlarged laterally and has a curved end 13 on the arc of a circle, as shown in dotted lines in Figure 1. Screws 14 may be used to fasten the end in the socket and then filler block 15 may be placed in position, as is well known in the art. The spokes preferably taper in thickness and in width from the hub portion to the rim and their inner end portion 16 is reduced in thickness and width on a transverse plane forming the shoulders 17 the portion 16 being rectangular in cross section and having materially greater width than thickness. The inner end 18 of the reduced portion 16 is on the arc of a cylinder, the edges 19, 20 at the ends of the curved portion being on radial planes with the center of the curve as the center.

A disk 21 having four straight edges at right angles to each other on the lines of a square composed of wood having the grain running diagonally across it from one corner to the other, as shown in Figure 3, has grooves 22 and 23 formed centrally across it from the two pairs of opposite sides and these grooves have a depth equal to the thickness of the reduced end portion 16 of the spokes and a width equal to the width of that reduced portion of the spoke so that the ends of the spokes will closely fit in the groove.

A cylindrical opening 24 is formed centrally in the disk and when the ends of the spokes are in the grooves the curved inner ends of the reduced portion 16 will be aligned with the cylindrical opening 24 to receive the steering post. The shoulder between the reduced inner end portion 16 of each spoke and the adjacent portion of the spoke fits against the side of the disk 21 and the slight outward curve 25 next to the reduced portion will be aligned with the concave curved portion 26 of the disk at its corners between the spokes. A disk 27 made of a single piece of wood and having four straight side edges at right angles in the form of a square with concave curves at the corners shown in Figure 4, has the grain of the wood running diagonally from one corner to the opposite corner. This disk 27 is of substantially uniform thickness and has a central circular opening 28 corresponding in size and position to the opening 24 in the disk 21. As will be seen by reference to Figure 2, this disk fits the upper surfaces of the elevated portions 29 of block 21 and the upper surfaces of the inner end portions 16 of the spokes in the grooves 22 and 23 and thus the inner ends of the spokes are enclosed between the two disks and the disks are so arranged that the grain of the wood in one is at right angles to that of the wood in the other and it will be noted that with four spokes as shown, this results in the grain of the wood of each spoke being at an angle of about 45° to the grain of the wood in either or both disks. The parts of the hub as assembled may be securely held together in position by adhesives such as glue and in use they will of course be held by the metal means used for attaching the steering wheel to the steering post which is well known in the art.

Although one specific embodiment of the invention is shown for purposes of illustration, it will be noted that it is not confined to the details shown beyond what is called for in the claims.

Having thus described the invention what is claimed as new and desired to be secured by Letters Patent is:

1. A steering wheel comprising in combination a rim, a plurality of wooden spokes and a wooden hub portion including upper and lower disks of wood with the grain of the wood at substantially right angles to each other and inner end portions of the spokes between the upper and lower surfaces of said disks.

2. A steering wheel comprising in combination a rim, a plurality of wooden spokes having inner end portions of reduced thickness and a wooden hub portion including upper and lower disks of wood with the grain of the wood at substantially right angles to each other and the reduced inner end portions of the spokes between the upper and lower surfaces of said disks.

3. A steering wheel comprising in combination a rim, a plurality of wooden spokes and a wooden hub portion including upper and lower disks of wood with the grain of the wood at substantially right angles to each other and at an angle to the grain of the wood in each spoke and inner end portions of the spokes between the upper and lower surfaces of said disks.

4. A steering wheel comprising in combination a rim, a plurality of wooden spokes having inner end portions or reduced thickness and a wooden hub portion including upper and lower disks of wood with the grain of the wood at substantially right angles to each other and the reduced inner end portions of the spokes between the upper and lower surfaces of said disks, each spoke having its upper and lower surfaces at the hub in substantially the same planes at right angles to the axis of the wheel as those of said disks.

5. A steering wheel comprising in combination a rim, a plurality of wooden spokes and a wooden hub portion including upper and lower disks of wood with the grain of the wood at substantially right angles to each other having central circular openings and straight plane surfaces of contact and radial sockets between them corresponding in number to the number of spokes and inner end portions of said spokes closely fitting in said sockets.

6. A steering wheel comprising in combination a rim, a plurality of wooden spokes having inner end portions of reduced thickness and width forming shoulders on a transverse plane facing the ends, and a wooden hub portion including upper and lower disks of wood with the grain of the wood at an angle to each other having central circular openings and straight plane surfaces of contact and radial sockets between them corresponding in shape, size and number to the reduced inner end portions of said spokes the said inner end portions of said spokes closely fitting in said sockets with their shoulders abutting the adjacent edge surfaces of said disks.

7. A steering wheel comprising in combination a rim, a plurality of wooden spokes having inner end portions of reduced thickness and width forming shoulders on a transverse plane facing the ends, and a wooden hub portion including upper and lower disks of wood with the grain of the wood at an angle to each other having central circular openings and straight plane surfaces of contact and radial sockets between them corresponding in shape, size and number to the reduced inner end portions of said spokes the said inner end portions of said spokes closely fitting in said sockets and treminating at said central opening on the arc of a corresponding circle with their end edges in lateral contact on short radial planes and with their shoulders abutting the adjacent edge surfaces of said disks.

8. A steering wheel comprising in combination a rim, a plurality of wooden spokes having inner end portions of reduced thickness and width forming shoulders on a transverse plane facing the end rectangular in cross section and a wooden hub portion including a wooden disk having a thickness corresponding approximately to the heighth of the upper and lower shoulders and a materially thicker disk of corresponding outline, in surface contact with said first disk having radial grooves rectangular in cross section in its contact service corresponding in number to said spokes and in width and depth to the width and thickness of said reduced inner end portions of said spokes and in which said inner end portions closely fit with their shoulders abutting the adjacent edge portions of said disks the grain of the wood in said disks being at an angle to each other and to that of the spokes.

9. A steering wheel comprising in combination a rim, a plurality of wooden spokes having inner end portions of reduced thickness and width on a transverse plane rectangular in section and a wooden hub portion including upper and lower disks of wood in surface contact with matching edge portions on the lines of a square and with radial sockets at right angles to said edge rectangular in section corresponding in number and size to said inner end portions of said spokes and in which said ends closely fit, the outer surfaces of said disks between said spokes and the adjacent side surfaces of said spokes being on concave curved lines thus forming a symmetrical hub and spoke.

10. A steering wheel comprising in combination a rim, a plurality of wooden spokes having inner end portions of reduced thickness and width on a transverse plane rectangular in section and a wooden hub portion including upper and lower disks of wood in surface contact with matching edge portions on the lines of a square and with radial sockets at right angles to said edge rectangular in section corresponding in number and size to said inner end portions of said spokes and in which said ends closely fit, the outer surfaces of said disks between said spokes and the adjacent side surfaces of said spokes being on concave curved lines thus forming a symmetrical hub and spoke, the upper and lower surfaces of the rectangular inner end portions of the spokes being in planes parallel to that of the rim and the intermediate portions of the spokes at a slight angle thereto and tapering outwardly.

11. A steering wheel of the class described comprising in combination a continuous rim adapted to be grasped by the hand of the operator, a plurality of wooden spokes secured at their outer ends to the rim, a wooden hub portion composed of seperate pieces of wood the inner ends of the spokes filling sockets in the remainder of the wood of the hub and forming part of it the hub having a central opening.

12. A steering wheel of the class described comprising in combination a continuous wooden rim adapted to be grasped by the hand of the operator, a plurality of wooden spokes secured at their outer ends to the rim and having inner end portions of reduced rectangular cross section, a wooden hub portion composed of separate pieces of wood the inner reduced ends of the spokes filling radial sockets in the remainder of the wood of the hub and forming part of it, the hub having a central opening.

13. A steering wheel of the class described comprising in combination a continuous rim adapted to be grasped by the hand of the operator, a plurality of wooden spokes secured at their outer ends to the rim, a wooden hub portion composed of separate pieces of wood the inner ends of the spokes filling sockets in the remainder of the wood of the hub and forming part of it the exposed surfaces of the spokes and hub joining each other on symmetrical lines.

14. A steering wheel of the class described comprising in combination a continuous rim adapted to be grasped by the hand of the operator, a plurality of wooden spokes secured at their outer ends to the rim, a wooden hub portion composed of separate pieces of wood the inner ends of the spokes filling sockets in the remainder of the wood of the hub and forming part of it the exposed surfaces of the spokes and hub joining each other on symmetrical lines, the spokes being at an incline to the plane of the rim and the upper and lower surfaces of the hub substantially parallel to it.

15. A steering wheel of the class described comprising in combination a continuous rim adapted to be grasped by the hand of the operator, a plurality of wooden spokes secured at their outer ends to the rim extending inwardly at an angle to the plane of the rim and having inner end portions of reduced rectangular cross section having upper and lower surfaces parallel to the plane of the rim, a wooden hub portion composed of separate pieces of wood and having radial sockets in which the inner end reduced portions of the spokes closely fit and form part of the hub, the hub being provided with a central opening.

16. A steering wheel of the class described comprising in combination a continuous wooden rim adapted to be grasped by the hand of the operator, a plurality of wooden spokes secured at their outer ends to the rim, and a wooden hub portion composed of a plurality of pieces of wood rigidly secured together and having a central opening, the inner ends of the spokes being within the hub portion and forming part of it the exposed surfaces of the spokes and hub portion joining on symmetrical lines, the spokes being at a slight angle to the plane of the rim and tapering outwardly.

17. A steering wheel of the class described comprising in combination a continuous wooden rim adapted to be grasped by the hand of the operator, a plurality of wooden spokes secured at their outer ends to the rim, a wooden hub portion composed of separate pieces of wood and having a central opening, the inner end portions of the spokes being of less thickness than the adjacent portions thereof and than the hub portion and being within the hub portion forming parts of it, the exposed surfaces of the spokes and hub joining on symmetrical lines.

18. A steering wheel of the class described comprising in combination a continuous wooden rim adapted to be grasped by the hand of the operator, a plurality of wooden spokes secured at their outer ends to the rim, a wooden hub portion including upper and lower surface portions each consisting of a single piece of wood and having a central opening, the inner end portions of the spokes being within said hub portion between said upper and lower portions.

19. A steering wheel of the class described comprising in combination a continuous wooden rim adapted to be grasped by the hand of the operator, a plurality of wooden spokes secured at their outer ends to the rim, a wooden hub portion, the inner end portions of said spokes being in the hub portion and being in lateral surface contact throughout the greater part of their length with rigid parts of the hub portion between the inner end portions of adjacent spokes, the exposed surfaces of the spokes and hub joining in symmetrical lines.

In testimony whereof I hereunto affix my signature.

O K SNYDER.